(12) United States Patent
Faulkner

(10) Patent No.: US 9,512,720 B2
(45) Date of Patent: Dec. 6, 2016

(54) CABLE BOLT

(71) Applicant: FCI Holdings Delaware, Inc., Wilmington, DE (US)

(72) Inventor: Dakota Faulkner, New Kensington, PA (US)

(73) Assignee: FCI Holdings Delaware, Inc., Wilmington, DE (US)

( * ) Notice: Subject to any disclaimer, the term of this patent is extended or adjusted under 35 U.S.C. 154(b) by 0 days.

(21) Appl. No.: 14/026,045

(22) Filed: Sep. 13, 2013

(65) Prior Publication Data

US 2014/0147227 A1 May 29, 2014

Related U.S. Application Data

(60) Provisional application No. 61/701,218, filed on Sep. 14, 2012.

(51) Int. Cl.
| | | |
|---|---|---|
| *E21D 21/00* | (2006.01) | |
| *F16J 15/06* | (2006.01) | |
| *E21D 20/02* | (2006.01) | |

(52) U.S. Cl.
CPC ......... *E21D 21/0026* (2013.01); *E21D 20/028* (2013.01); *E21D 21/006* (2016.01); *F16J 15/06* (2013.01)

(58) Field of Classification Search
CPC ......... E02D 5/80; E21D 20/00; E21D 21/00; E21D 21/0026; F16J 15/06
USPC ............ 405/259.1, 259.4, 259.5, 259.6, 288, 405/302.1, 302.2
See application file for complete search history.

(56) References Cited

U.S. PATENT DOCUMENTS

| | | | |
|---|---|---|---|
| 4,693,638 A  * | 9/1987  | Unrug et al. | ............... 405/259.3 |
| 5,003,749 A | 4/1991 | Harke | |
| 5,791,824 A | 8/1998 | Radtke | |
| 6,428,243 B1 | 8/2002 | Hutchins | |
| 6,612,783 B2 * | 9/2003 | Stankus et al. | ............ 405/259.5 |
| 2009/0041550 A1* | 2/2009 | Oldsen et al. | ............. 405/259.3 |
| 2011/0217126 A1 | 9/2011 | Oldsen et al. | |
| 2012/0039672 A1 | 2/2012 | Hall et al. | |

FOREIGN PATENT DOCUMENTS

| | | | | |
|---|---|---|---|---|
| AU | 2009201044 A1 | 10/2009 | | |
| CN | 2389176 Y | 7/2000 | | |
| WO | 9312324 A1 | 6/1993 | | |
| WO | 02077372 A1 | 10/2002 | | |
| WO | 2008128301 A1 | 10/2008 | | |
| WO | 2010019971 A1 | 2/2010 | | |
| WO | WO 2010/059168 | * | 5/2010 | ................ 405/259.4 |
| WO | 2011057349 A1 | 5/2011 | | |
| WO | 2012000016 A1 | 1/2012 | | |

* cited by examiner

*Primary Examiner* — John Kreck
*Assistant Examiner* — Carib Oquendo
(74) *Attorney, Agent, or Firm* — The Webb Law Firm

(57) ABSTRACT

A cable bolt comprises a cable having an elongate body with a first end and a second end, a barrel and wedge assembly attached to the cable at a position adjacent to the first end of the cable, and a seal member having a body defining a passageway that receives a portion of the elongate body of the cable. The body of the seal member includes at least one rib extending radially outward from the body of the seal member.

15 Claims, 7 Drawing Sheets

CABLE BOLT

The present application claims the benefit of U.S. Provisional Application Ser. No. 61/701,218, filed Sep. 14, 2012, the entire disclosure of which is hereby incorporated by reference.

BACKGROUND OF THE INVENTION

1. Field of the Invention

The present invention relates to cable bolts and, in particular, cable bolts that are installed in mine roof boreholes.

2. Description of Related Art

Cable bolts are used in the mining industry for their ease of handling and installation. Cable bolts are substantially easier to fit into a borehole than the elongated rods of conventional rod bolt systems. Regardless of the height limitations in a mine, cable bolts may be adapted to boreholes of any length due to their flexibility. The strength capacity of cables typically exceeds that of conventional rod bolts and, therefore, cable is the preferred reinforcement for certain roof conditions. Cable bolts are typically installed by placing a resin cartridge, including catalyst and adhesive material, into the blind end of a borehole, inserting the cable bolt into the borehole so that the upper end of the cable bolt rips open the resin cartridge and the resin flows in the annulus between the borehole and the cable bolt, rotating the cable bolt to mix the resin catalyst and adhesive, and allowing the resin to set about the cable bolt. In such cable bolts, the resin is typically set at an upper portion of the cable bolt at the blind end of the borehole. In certain installations of mine roof bolts, fully grouting the entire length of the bolt that is received within the borehole may be desirable so as to provide extended corrosion protection and/or enhanced anchorage in the surrounding rock strata.

Cable bolts tend to be longer in length than standard fully grouted rebar bolts, which allow cable bolts to reach higher layers of strata that may contain large amounts of water in the cracks and fissures of the rock strata. The water can flow out of a borehole at several gallons per minute, which may cause poor working conditions and slow mine production.

SUMMARY OF THE INVENTION

In one embodiment, a cable bolt comprises a cable having an elongate body with a first end and a second end, a barrel and wedge assembly attached to the cable at a position adjacent to the first end of the cable, and a seal member having a body defining a passageway that receives a portion of the elongate body of the cable. The body of the seal member includes at least one rib extending radially outward from the body of the seal member.

The seal member may comprise an elastomeric material. The at least one rib may extend circumferentially around the body of the seal member. The seal member may comprise a plurality of ribs extending radially outward from the body of the seal member, with each of the ribs extending circumferentially around the body of the seal member. The body of the seal member has a first end and a second end. The first end of the seal member may be positioned closer to the first end of the cable than the second end of the seal member, and the seal member may be wider at a position intermediate the first and second ends of the body of the seal member relative to a width of the seal member at the second end of the body of the seal member. A diameter of one of the plurality of ribs at a position adjacent to the second end of the body of the seal member may be smaller than a diameter of another one of the plurality of ribs at a position intermediate the first and second ends of the body of the seal member. Diameters of the plurality of ribs may progressively increase from the first and second ends of the body of the seal member towards the middle of the body.

The seal member may be configured to compress when inserted into a borehole and form a seal between the seal member and the borehole. The cable may comprise a plurality of strands defining a plurality of gaps between each of the plurality of strands, with the plurality of gaps receiving a sealing material for a portion of a length of the cable. The sealing material may be positioned adjacent to the first end of the cable and positioned between the barrel and wedge assembly and the cable. The cable bolt may further comprise a stiffener that receives a portion of the cable, with the stiffener positioned adjacent to the barrel and wedge assembly, and the sealing material positioned between the stiffener and the cable. The cable bolt may further comprise a drive nut that defines a passageway, the passageway of the drive nut receiving the first end of the cable.

In a further embodiment, a cable bolt includes a cable having an elongate body with a first end and a second end and the cable comprising a plurality of strands defining a plurality of gaps between each of the plurality of strands. The cable bolt further includes a barrel and wedge assembly attached to the cable at a position adjacent to the first end of the cable, and sealing material positioned in the plurality of gaps for a portion of a length of the cable.

The sealing material may be positioned adjacent to the first end of the cable and positioned between the barrel and wedge assembly and the cable. The cable bolt may further comprise a stiffener that receives a portion of the cable, with the stiffener positioned adjacent to the barrel and wedge assembly and the sealing material positioned between the stiffener and the cable.

In another embodiment, a method of manufacturing a cable bolt includes providing a cable having an elongate body with a first end and a second end. The cable comprises a plurality of strands defining a plurality of gaps between each of the plurality of strands. The method further includes injecting sealing material in the plurality of gaps for a portion of a length of the cable.

The sealing material may comprise silicon. The method may also include positioning a drive nut and a barrel and wedge assembly adjacent to the first end of the cable.

In yet another embodiment, a sealing member for use with a mine roof bolt includes a body defining a passageway that receives a portion of the elongate body of the cable, and a plurality of ribs. Each of the plurality of ribs extends radially outward from the body and extends circumferentially around the body. At least one of the plurality of ribs is configured to compress when inserted into a borehole and form a seal between the seal member and the borehole.

The body of the seal member may have a first end and a second end, with the seal member being wider at a position intermediate the first and second ends of the body relative to a width of the seal member at the second end of the body of the seal member.

DESCRIPTION OF THE PREFERRED EMBODIMENTS

Figure 1:
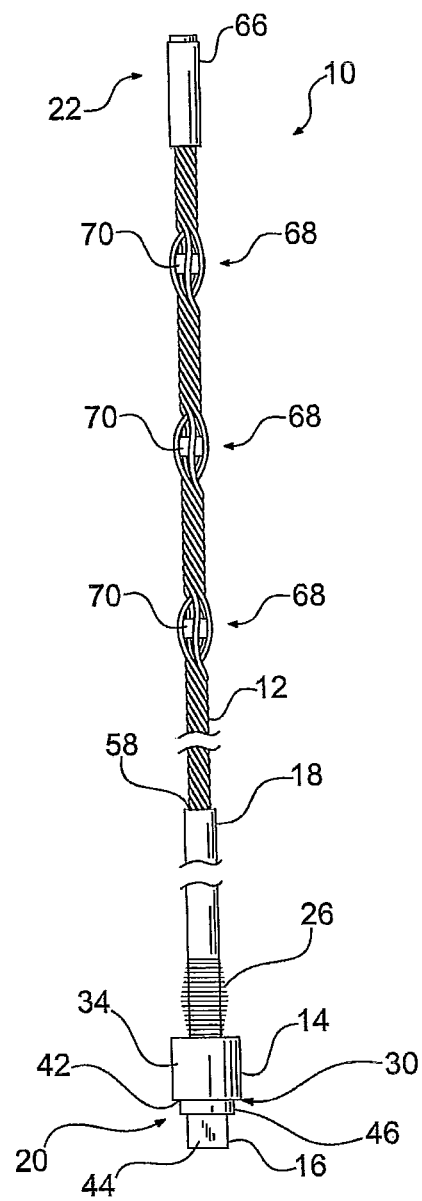
FIG. 1 is a side elevational view of a cable bolt according to one embodiment of the present invention.
Figure 2:
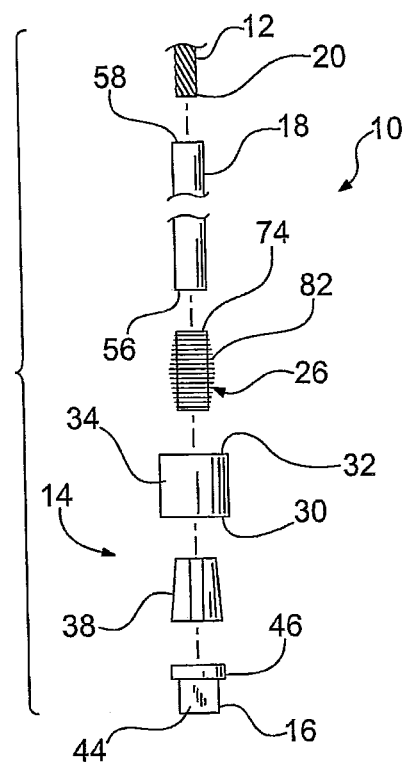
FIG. 2 is a partial exploded assembly view of the cable bolt shown in FIG. 1.

For purposes of the description hereinafter, the terms "upper", "lower", "right", "left", "vertical", "horizontal", "top", "bottom", and derivatives thereof, shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 3:
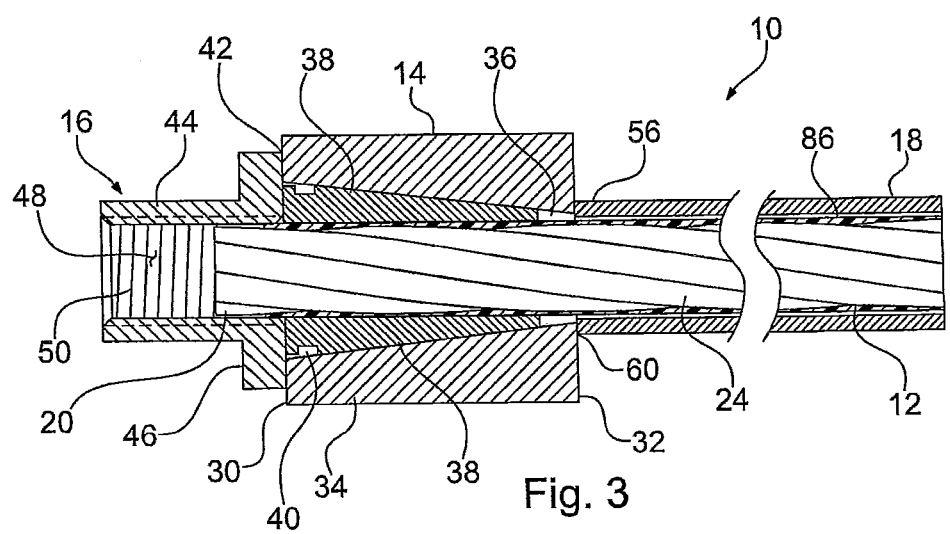
FIG. 3 is a partial cross-sectional view of a first end of the cable bolt of FIG. 1.
Figure 4:
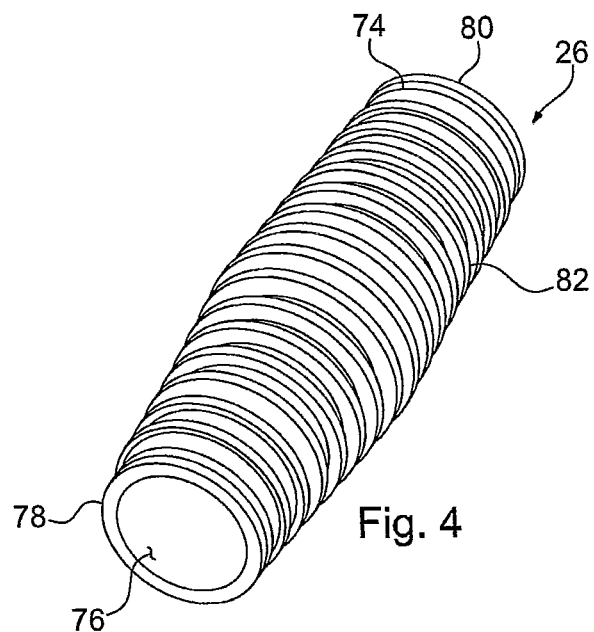
FIG. 4 is a perspective view of a seal member according to one embodiment of the present invention.
Figure 5:
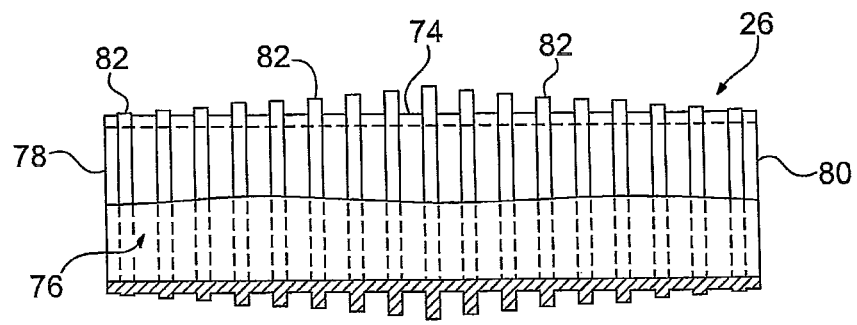
FIG. 5 is a partial cross-sectional view of the seal member shown in FIG. 4.

Referring to FIGS. 1-7, one embodiment of a cable bolt 10 includes a multi-strand cable 12, a barrel and wedge assembly 14, a nut 16, and a stiffener 18. The cable 12 includes a first end 20 and a second end 22, and may be a seven-strand type which has a center strand enclosed by six helically-wound outer strands with a uniform pitch of between twelve and sixteen times the nominal diameter of the cable, which may be 0.7 inch. However, other suitable types of cable may be utilized for the cable 12. Strands 24 of the multi-strand cable 12 define a plurality of gaps. A gap is also defined between the outside of the cable 12 and the nut 16, the barrel and wedge assembly 14, and the stiffener 18. The barrel and wedge assembly 14 is attached to the cable 12 at a position adjacent to the first end 20 of the cable 12. The cable bolt 10 further includes a seal-member 26 that is positioned over the stiffener 18 intermediate the first end 20 and second end 22 of the cable 12. The seal member 26, which is omitted from FIG. 3, is described in more detail below. The barrel and wedge assembly 14 has a first end 30 and a second end 32, and includes a housing 34 that is generally cylindrical. The housing 34 of the barrel and wedge assembly 14 defines a passageway 36 that receives a plurality of wedges 38. The barrel and wedge assembly 14 is a well-known arrangement for receiving the loading requirements of a cable bolt. The plurality of wedges 38 may be a two-piece or three-piece arrangement. Prior to installation, the wedges 38 may at least initially be held together with a band (not shown) received within grooves 40.

The nut 16 is positioned adjacent to the first end 30 of the barrel and wedge assembly 14. The nut 16 may define a sealed interface 42 between the nut 16 and the barrel and wedge assembly 14. The nut 16 includes a body 44 having a flange 46 extending radially outward from the body 44. The body 44 of the nut 16 defines a passageway 48 extending through the body 44 in a longitudinal direction thereof. The passageway 48 of the nut 16 receives the first end 20 of the cable 12. The nut 16 may be secured to the first end 20 of the cable 12 such as by crimping the nut 16 onto the cable 12 or through any other suitable fastening arrangement. The nut 16 also includes an internally threaded portion 50. In particular, the threaded portion 50 is provided on the body 44 of the nut 16 within the passageway 48 and is adapted to receive a correspondingly threaded portion of a fitting (not shown) for introducing grout, sealant, or other material. The exterior surface of the nut 16 may be polygonal (four-sided or six-sided) or the like so as to be receivable by conventional mine roof bolt installation equipment (not shown). An O-ring (not shown) may 11e positioned between the nut 16 and the first end 30 of the barrel and wedge assembly 14 or the nut 16 may be welded to the barrel and wedge assembly 14 to provide the sealed interface 42 between the nut 16 and the housing 34 of the barrel and wedge assembly 14. The O-ring may be provided in a groove defined by the housing 34 or nut 16 or, alternatively, may be sandwiched between the nut 16 and the housing 34.

Referring again to FIGS. 1-3, the stiffener 18 is generally tube shaped and has a first end 56 and a second end 58. The stiffener 18 is positioned over and receives a portion of the cable 12. The first end 56 of the stiffener 18 is positioned adjacent to the second end 32 of the barrel and wedge assembly 14. The first end 56 of the stiffener 18 may define a sealed interface 60 between the first end 56 and the barrel and wedge assembly 14. The stiffener 18 may be crimped to the cable 12 at one or more positions along the length of the stiffener 18. An O-ring (not shown) may be positioned between the first end 56 of the stiffener 18 and the second end 32 of the barrel and wedge assembly 14 to provide the sealed interface 60 between the stiffener 18 and the housing 34 of the barrel and wedge assembly 14. The O-ring may be provided in a groove defined by the housing 34 or stiffener 18 or, alternatively, may be sandwiched between the stiffener 18 and the housing 34. Rather than providing an O-ring, the first end 56 of the stiffener 18 may be welded to the housing 34 of the barrel and wedge assembly 14 to provide the sealed interface 60 therebetween.

Referring to FIG. 1, the cable bolt 10 also includes an end button 66 that secures the free ends of the strands 24 of the cable 12 and birdcages 68 with nuts or buttons 70 received on the center wire, as are all known in the art. The cable bolt 10 may also include a plurality of buttons (not shown) surrounding and attached to the cable 12 at various points along the length of the cable 12. The provision of birdcages 68, or other mixing devices, improves mixing of grout during installation, as well as increasing the bond strength of the grout to the cable bolt 10. The cable bolt 10, however, may have no mixing devices and the cable 12 may be free of protrusions or disturbances along the length of the cable 12.

Referring to FIGS. 1, 2, 4, and 5, the seal member 26 includes an elongate body 74 that defines a passageway 76 extending longitudinally through the body 74. The passageway 76 of the body 74 receives the stiffener 18. The body 74 is generally cylindrical and includes a first end 78 and a second end 80. The first end 78 of the body 74 is positioned adjacent to the barrel and wedge assembly 14. The seal member 26 also includes a plurality of ribs 82, each extending circumferentially around the body 74 of the seal member 26. As shown more clearly in FIG. 5, each of the ribs 82 extends radially outward from the body 74. The length that the ribs 82 extend beyond the body 74 varies from the first end 78 to the second end 80 of the body 74. In particular, the rib 82 at the middle of the body 74 has the longest length or diameter, with the ribs 82 positioned adjacent to the first and second ends 78, 80 of the body 74 having the shortest length or diameter to provide a tapered shape. Thus, the diameters of the ribs 82 progressively increase from the first and second ends 78, 80 of the body 74 towards the middle of the body 74. The seal member 26 is generally flexible and configured to compress when inserted into a borehole. More specifically, the ribs 82 are configured to compress and/or deflect when inserted into a borehole to form a seal between the seal member 26 and the borehole, as discussed in more detail below. The tapered shape of the seal member 26 allows for easier insertion of the seal member 26 while still allowing for compression of the seal member 26. The seal member 26 may be manufactured from a rubber-like PVC material, although other suitable materials may also be utilized.

Figure 6:
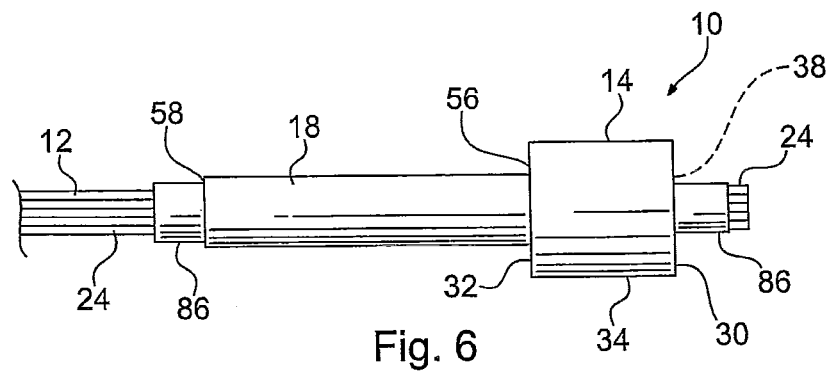
FIG. 6 is a partial elevational side view of the cable bolt of FIG. 1 showing a sealed portion.
Figure 7:
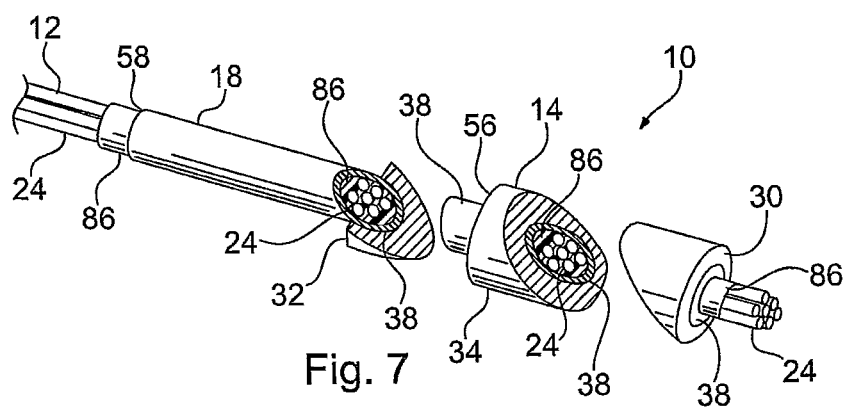
FIG. 7 is a partial cross-sectional view of the cable bolt of FIG. 1 showing a sealed portion.

Referring to FIGS. 3, 6, and 7, a portion of the multi-strand cable 12 of the cable bolt 10 adjacent to the first end 20 of the cable bolt 10 includes a sealing material 86 in the gaps between the strands 24 of the cable 12 and between the outside of the cable 12 and the nut 16, the barrel and wedge assembly 14, and the stiffener 18. The seal member 26 and the nut 16 have been omitted in FIGS. 6 and 7 for clarity. The sealing material 86 may be injected into the cable 12 during manufacture of the cable bolt 10 for ease of installation at the mine, but could also be applied at the time of installation. The sealing material 86 may be a polymeric sealant material, such as silicone, although other suitable materials for the sealing material may be utilized. The seal member 26 and the sealing material 86 effectively seal a lower portion of the bolt 10 within a borehole when the cable bolt 10 is installed, thereby preventing water from reaching the mine opening and mine travel ways. The installation of the cable bolt 10 is discussed in more detail below.

Figure 8:
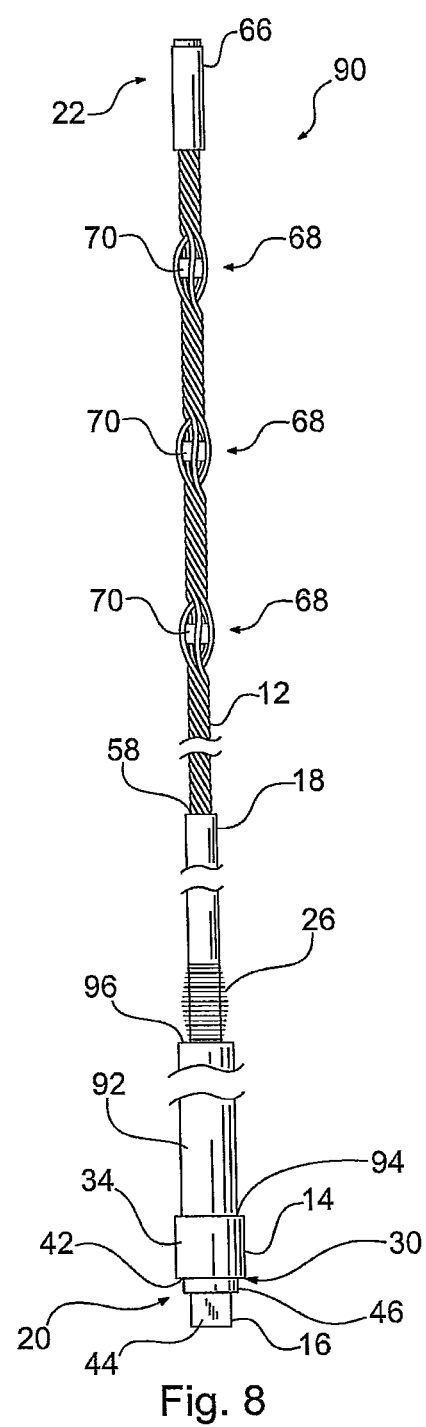
FIG. 8 is a side elevational view of a cable bolt according to a further embodiment of the present invention.

Referring to FIG. 8, a second embodiment of a cable bolt 90 is similar to the cable bolt 10 shown in FIGS. 1-7 and discussed above. Like reference numbers are used for like elements. The cable bolt 90 shown in FIG. 8 further includes a spacer 92 positioned over the stiffener 18 adjacent to the barrel and wedge assembly 14. The spacer 92 includes a first end 94 and a second end 96, and is generally tube shaped with an internal diameter of sufficient size to receive the stiffener 18. The first end 94 of the spacer 92 abuts the barrel and wedge assembly 14 and the seal member 26 abuts the second end 96 of the spacer 92. The spacer 92 is used to space the seal member 26 from the barrel and wedge assembly 14. Thus, the spacer 92 further extends the seal member 26 from the first end 20 of the multi-strand cable 12. In certain installations, the immediate roof strata can be uneven or have surface cracks, which will prevent the seal member 26 from sealing a borehole. The spacer 92 allows the seal member 26 to be inserted farther into the borehole to engage more suitable strata for creating a seal.

Figure 9:
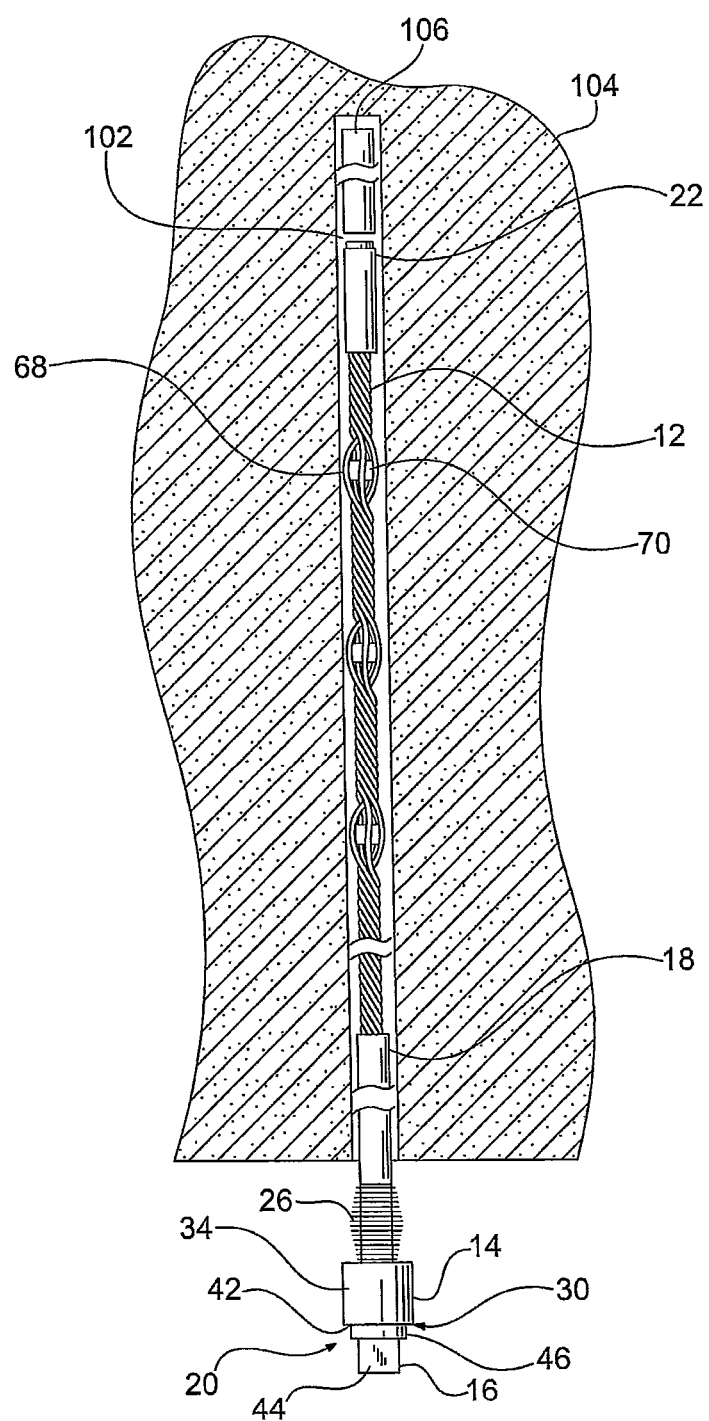
FIG. 9 is a side elevational view of the cable bolt of FIG. 1 showing the installation of the cable bolt.
Figure 10:
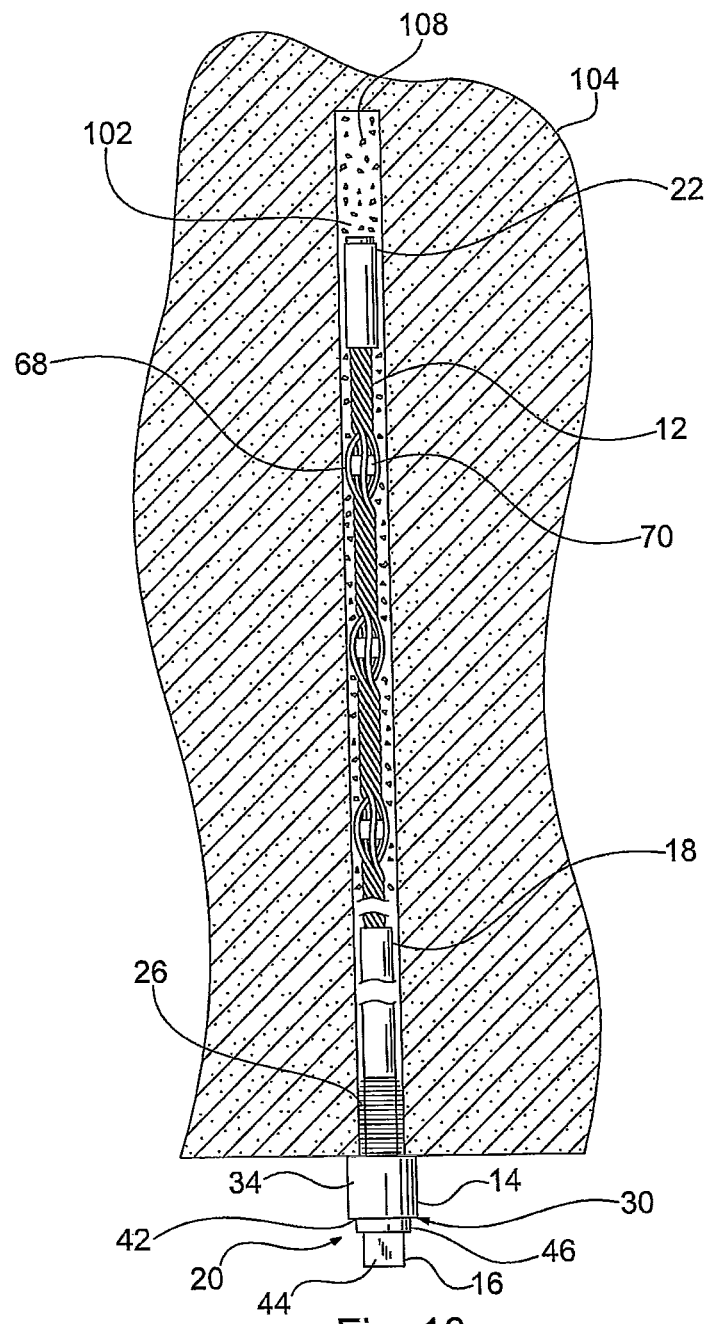
FIG. 10 is a side elevational view of the cable bolt of FIG. 1 showing the installation of the cable bolt.

Referring to FIGS. 9 and 10, the installation of the cable bolt 10 into a borehole 102 of a rock formation 104 to support the rock formation, such as a mine roof or rib, is shown. A capsule or a bundle of capsules 106 having a resin component and a catalyst component 108 is pushed to the top of the borehole 102 using a pushrod or conduit (not shown). The capsule 106 may be a polyester resin cartridge. The cable bolt 10 is positioned within the borehole 102 by placing the second end 22 of the multi-strand cable 12 into the borehole 102 such that the second end 22 of the cable 12 engages the capsule or capsules 106. As shown in FIG. 10, upon insertion of the cable bolt 10, the seal member 26 compresses and forms a seal between the seal member 26 and the rock formation 104 defining the borehole 102. Accordingly, the seal member 26 and the sealing material 86, which is shown more clearly in FIG. 7, seal the lower end of the borehole 102 to minimize or prevent water from flowing out of the borehole 102. The cable bolt 10 is rotated to fracture the capsule(s) 106 and mix the resin and catalyst components 108 released therefrom, which cure and harden, thereby securing the second end 22 of the multi-strand cable 12. The seal member 26 may remain fixed within the borehole 102 while the cable bolt 10 is rotated. After curing of the resin, the cable bolt 10 will be point-anchored to allow the cable bolt 10 to be tensioned and placed under a load. The cured resin and catalyst components 108 may only encapsulate 4-5 feet of the bolt 10, although the bolt 10 may be encapsulated for any suitable length. The cable bolt 10 may be installed with a bearing plate (not shown), such as a volcano plate, a flat plate, a channel plate, or any other suitable plate. Due to the flexibility of the seal member 26 and the sealing material 86, loading of the cable bolt 10 will not affect the seal formed by the seal member 26 and the sealing material 86, because the seal member 26 and the sealing material 86 will yield upon loading. The installation of the cable bolt 10 with the seal member 26 and the sealing material 86 allows the borehole 102 to be sealed to prevent water from entering the mine passageway in a less expensive manner than fully grouting the borehole 102 with polyurethane resin. The cable bolt 90 shown in FIG. 8 is installed in the same manner described above with the seal member 26 being inserted further into the borehole 102 and spaced from the barrel and wedge assembly 14.

In a further embodiment, the cable bolts 10, 90 shown in FIGS. 1-10 do not include the sealing material 86 and are fully grouted using a polyurethane resin or other suitable grout. More specifically, grout may be delivered to the passageway 48 of the nut 16 to the underside of the cable 12 as described in U.S. Patent Application Publication No. 2012/0039672, which is hereby incorporated by reference in its entirety. The grout flows through the plurality of gaps between the strands 24 of the cable 12 and the gap that extends between the outside of the cable 12, the housing 34 of the barrel and wedge assembly 14, the body 44 of the nut 16, and the stiffener 18. As grout is delivered into the nut 16 and to the underside of the cable 12, the grout flows up through the cable 12 and along the exterior surfaces of the cable 12 to substantially fill all of the gaps within the cable 12, as well as to fill the borehole 102. The grout may be delivered via a pump (not shown) having a pressure gauge. When a spike in the pump pressure is achieved, it is presumed that all of the gaps and the borehole are substantially filled and grout delivery may be ceased. The grout cures or solidifies, resulting in a column of grout surrounding and filling the cable bolt 10 anchored within the borehole 102. Suitable grout for use in the present embodiment is polyurethane resin, which is produced in situ from a polyol component and an isocyanate component. Such two-component polyurethane is used in underground mines for sealing cracks and the like, as provided by Weber Mining. The components are maintained in separate containers prior to use and may be delivered into a single stream via in-line mixer for delivery into the nut 16. The components are further mixed as they flow within and along the cable 12. During injection of the grout, the seal member 26 prevents the leakage of grout outside of the borehole 102, which substantially eliminates the waste of grout. In particular, the seal member 26 creates a seal within the borehole 102 the moment it is installed. In contrast, the installation of conventional fully grouted cable bolts typically requires waiting for the grout to cure at the bottom of the borehole to create a plug, which allows for leakage of the grout until the plug is created.

Although the invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the spirit and scope of the description. For example, it is to be understood that the present invention contemplates that, to the extent possible, one or more features of any embodiment can be combined with one or more features of any other embodiment.

The invention claimed is:

1. A cable bolt comprising:
   a cable having an elongate body with a first end and a second end, the cable comprising a plurality of strands defining a plurality of gaps between each of the plurality of strands;
   a barrel and wedge assembly attached to the cable at a position adjacent to the first end of the cable;
   a drive nut having a first end and a second end, the drive nut defining a passageway extending from the first end of the drive nut to the second end of the drive nut, the first end of the cable positioned within the passageway of the drive nut; and
   a seal member having a body defining a passageway that receives a portion of the elongate body of the cable, the body of the seal member including at least one rib extending radially outward from the body of the seal member, wherein the plurality of gaps receive a sealing material for a portion of a length of the cable, the sealing material positioned adjacent to the first end of the cable and positioned between the barrel and wedge assembly and the cable.

2. The cable bolt of claim 1, wherein the seal member comprises an elastomeric material.

3. The cable bolt of claim 2, wherein the at least one rib extends circumferentially around the body of the seal member.

4. The cable bolt of claim 1, wherein the seal member comprises a plurality of ribs extending radially outward from the body of the seal member, each of the ribs extending circumferentially around the body of the seal member.

5. The cable bolt of claim 4, wherein the body of the seal member has a first end and a second end, the first end of the seal member positioned closer to the first end of the cable than the second end of the seal member, and wherein the seal member is wider at a position intermediate the first and second ends of the body of the seal member relative to a width of the seal member at the second end of the body of the seal member.

6. The cable bolt of claim 5, wherein a diameter of one of the plurality of ribs at a position adjacent to the second end of the body of the seal member is smaller than a diameter of another one of the plurality of ribs at a position intermediate the first and second ends of the body of the seal member.

7. The cable bolt of claim 5, wherein diameters of the plurality of ribs progressively increase from the first and second ends of the body of the seal member towards the middle of the body.

8. The cable bolt of claim 1, wherein the seal member is configured to compress when inserted into a borehole and form a seal between the seal member and the borehole.

9. The cable bolt of claim 1, further comprising a stiffener that receives a portion of the cable, the stiffener positioned adjacent to the barrel and wedge assembly, the sealing material positioned between the stiffener and the cable.

10. The cable bolt of claim 1, further comprising a stiffener that receives a portion of the cable, the stiffener positioned adjacent to the barrel and wedge assembly.

11. A cable bolt comprising:
    a cable having an elongate body with a first end and a second end, the cable comprising a plurality of strands defining a plurality of gaps between each of the plurality of strands;
    a barrel and wedge assembly attached to the cable at a position adjacent to the first end of the cable;
    a stiffener receiving a portion of the cable, the stiffener including a first end positioned adjacent to the barrel and wedge assembly and a second end positioned opposite the first end of the stiffener; and
    sealing material positioned in the plurality of gaps for only a portion of a length of the cable that extends from a position adjacent to the first end of the cable to a position adjacent the second end of the stiffener, wherein the sealing material is positioned between the barrel and wedge assembly and the cable and between the stiffener and the cable.

12. The cable bolt of claim 11, wherein the sealing material comprises silicone.

13. A method comprising:
    providing a cable having an elongate body with a first end and a second end, the cable comprising a plurality of strands defining a plurality of gaps between each of the plurality of strands, the first end of the cable having a seal member defining a passageway that receives a portion of the elongate body of the cable, the body of the seal member including at least one rib extending radially outward from the body of the seal member;
    positioning a barrel and wedge assembly adjacent to the first end of the cable;
    injecting a polymeric material in the plurality of gaps at the first end of the cable for a portion of a length of the cable to seal the plurality of gaps, wherein the polymeric material is positioned adjacent to the first end of the cable and positioned between the barrel and wedge assembly and the cable.

14. The method of claim 13, wherein the sealing polymeric material comprises a silicone sealant.

15. The method of claim 13, further comprising positioning a drive nut adjacent to the first end of the cable.

* * * * *